United States Patent
Shepard et al.

(10) Patent No.: US 6,796,144 B2
(45) Date of Patent: Sep. 28, 2004

(54) SYSTEM AND METHOD FOR GLASS PROCESSING AND TEMPERATURE SENSING

(75) Inventors: Chester L. Shepard, West Richland, WA (US); Bret D. Cannon, Richland, WA (US); Mohammad A. Khaleel, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 267 days.

(21) Appl. No.: 09/870,332

(22) Filed: May 30, 2001

(65) Prior Publication Data

US 2003/0024269 A1 Feb. 6, 2003

(51) Int. Cl.[7] ............................................... C03B 27/00
(52) U.S. Cl. .................... 65/29.11; 65/29.18; 65/29.19; 65/114; 65/158; 65/161; 65/162; 65/DIG. 13; 356/43; 374/9; 374/120
(58) Field of Search ............................. 65/29.11, 29.18, 65/29.19, 114, 115, 158, 161, 162, DIG. 13; 356/43; 374/9, 120

(56) References Cited

U.S. PATENT DOCUMENTS

| | | | |
|---|---|---|---|
| 3,607,175 A | * 9/1971 | Robinson | 65/29.18 |
| 3,637,364 A | * 1/1972 | Montgomery | 65/29.14 |
| 3,894,806 A | * 7/1975 | Remy et al. | 356/239.4 |
| 4,043,780 A | 8/1977 | Bricker et al. | |
| 4,185,982 A | 1/1980 | Schwenninger | |
| 4,374,328 A | * 2/1983 | Tekippe et al. | 250/458.1 |
| 4,578,102 A | 3/1986 | Colmon et al. | |
| 4,888,038 A | 12/1989 | Herrington et al. | |
| 5,067,977 A | * 11/1991 | Deb | 65/29.19 |
| 5,279,635 A | 1/1994 | Flaugher et al. | |
| 5,310,260 A | * 5/1994 | Schietinger et al. | 374/142 |
| 5,330,549 A | 7/1994 | Carlomagno et al. | |
| 5,332,316 A | 7/1994 | Kleinerman | |
| 5,568,978 A | * 10/1996 | Johnson et al. | 374/161 |
| 5,653,539 A | * 8/1997 | Rosengaus | 374/159 |
| 5,730,528 A | 3/1998 | Allison et al. | |
| 5,735,922 A | 4/1998 | Woodward et al. | |
| 5,846,281 A | 12/1998 | Nikander et al. | |
| 5,931,981 A | 8/1999 | McMaster et al. | |
| 5,938,810 A | 8/1999 | DeVries, Jr. et al. | |
| 6,079,227 A | 6/2000 | Yoshizawa et al. | |
| 2003/0021331 A1 | * 1/2003 | Balla et al. | 374/161 |
| 2003/0048831 A1 | * 3/2003 | Lemoine et al. | 374/135 |

OTHER PUBLICATIONS

Mitachi, Seiko, "Dispersion Measurement on Fluoride Glasses and Fibers," Journal of Lightwave Tech., vol. 7, No. 8, Aug. 1989, pp. 1256–1263.*

Layne et al., "Multiphonon relaxation of rare–earth ions in oxide glasses," Physical Review B, vol. 16, No. 1, July 1977, pp. 10–20.*

(List continued on next page.)

*Primary Examiner*—Sean Vincent
(74) *Attorney, Agent, or Firm*—Woodard, Emhardt, Moriarty, McNett & Henry LLP

(57) ABSTRACT

Techniques for measuring the temperature at various locations through the thickness of glass products and to control the glass processing operation with the sensed temperature information are disclosed. Fluorescence emission of iron or cerium in glass is excited and imaged onto segmented detectors. Spatially resolved temperature data are obtained through correlation of the detected photoluminescence signal with location within the glass. In one form the detected photoluminescence is compared to detected scattered excitation light to determine temperature. Stress information is obtained from the time history of the temperature profile data and used to evaluate the quality of processed glass. A heating or cooling rate of the glass is also controlled to maintain a predetermined desired temperature profile in the glass.

46 Claims, 14 Drawing Sheets

OTHER PUBLICATIONS

Mann D. and Viskanta R., *An Inverse Method for Determining Transient Temperature Distribution in Glass Plates*, Inverse Problems in Engineering, vol. 1, pp. 273–291.

Weber, M.J., *Radiative and Multiphonon Relaxation of Rare–Earth Ions in $Y_2O_3$*, The Physical Review, vol.171, No. 2, Jul. 10, 1968.

Risebert, L.A. and Moos, H.W., *Multiphonon Orbit–Lattice Relaxation of Excited States of Rare–Earth Ions in Crystals*, The Physical Review, vol. 174, No. 3, Oct. 10, 1968.

Maurice, Eric; Wade, Scott A.; Collins, Stephen F.; Monnorn, Gerard and Baxter, Greg W., *Self–referenced Point Temperature Sensor Based on a Flourescence Intensity Ratio in $Yb^{3+}$–doped Silica Fiber*, Applied Optics, vol. 36, No. 31 Nov. 1, 1997.

Glebov, L.B. and Boulos, E.N., *Absorption of Iron and Water in the $Na_2O$–$CaO$–$MgO$–$SiO_2$ Glasses. II. Selection of Intrinsic, Ferric, and Ferrous Spectra in the Visible and UV Regions*, Journal of Non–Crystalline Solids 242, pp. 49–62 (1998).

Collins, S.F., Baxter, G.W. and Wade, S.A., *Comparison of Flourescence–based Temperature Sensor Schemes: Theoretical Analysis and Experimental Validation*, Journal of Applied Physics, vol. 84 No. 9 Nov. 1, 1998.

Proceedings of the FY 1999 glass Industry Project Review, Sep. 13–14, 1999.

Wade, S.A., Muscat, J.C., Collins, S.F. and Baxter, G.W., *$Nd^{3+}$–doped Optical Fiber Temperature Sensor Using the Fluorescence Intesity Ratio Techniques*, Review of Scientific Instruments, vol. 70, No. 11 Nov. 1999.

Wade, S.A., Baxter, G.W. and Collins, S.F., *Simultaneous Strain–Temperature measurement Using Fluorescence from Yb–doped Silica Fiber*, Review of Scientific Instruments, vol. 71, No. 6 Jun. 2000.

Grattan, K.T.V. and Zhang, Z.Y., Fiber Optic Fluorescence Thermometry, Chapter 1.

* cited by examiner-

US 6,796,144 B2

SYSTEM AND METHOD FOR GLASS PROCESSING AND TEMPERATURE SENSING

This invention was made with Government support under Contract Number DE-AC0676RLO1830 awarded by the U.S. Department of Energy. The Government has certain rights in the invention.

FIELD OF THE INVENTION

The present invention is related to glass processing and to glass processing with temperature sensing. More particularly, but not exclusively, the present invention is directed to through thickness temperature sensing during glass processing and methods of improving the quality of processed glass.

BACKGROUND OF THE INVENTION

The efficient production of glass requires that the glass be at certain bulk temperatures during different stages of the production line, and the final properties of the glass product depend upon the processing temperatures and temperature history of the glass. For example, in the automotive industry, forming of glass is most effectively done when the glass is kept within a certain temperature range. In the case of tempered glass products, the stress locked into the product, which controls the strength and durability of the piece, also depends on the rate at which the product is quenched in a final step and on the temperature gradients established during quenching. The quenching rate may also influence, at least to some extent, the final shape of the piece. Hence there is a need for both general and specific knowledge of the glass temperature throughout the production process, and it is desirable to obtain this knowledge rapidly, efficiently, and without contacting the glass or otherwise disturbing the manufacturing process.

In some cases, knowledge of the bulk temperature or the surface temperature can be sufficient. In others, such as during the tempering step, spatial and temporal temperature gradients influence the final properties and shape of the glass piece and thus more precise knowledge could be beneficial. Unfortunately, great difficulties exist when making temperature measurements in glass, and these problems are particularly acute for dynamic conditions. For example, during typical quenching, a large quantity of cooling fluid impinges on the glass surface, creating numerous heat sources and heat sinks which compound the problems of passively determining the temperature of the glass.

Therefore a need exists for an improved method and apparatus for measuring temperature in glass products that has the ability to be non-contacting, real time, and through-thickness. There is also a need for a system and method that is economical and reliable even under the dynamic and extreme conditions experienced during quenching. There is also a need for a system and method that utilizes sensed temperature information to reduce waste and improve quality in a glass manufacturing process. One or more embodiments of the present invention address these or other needs.

SUMMARY OF THE INVENTION

Figure 1:
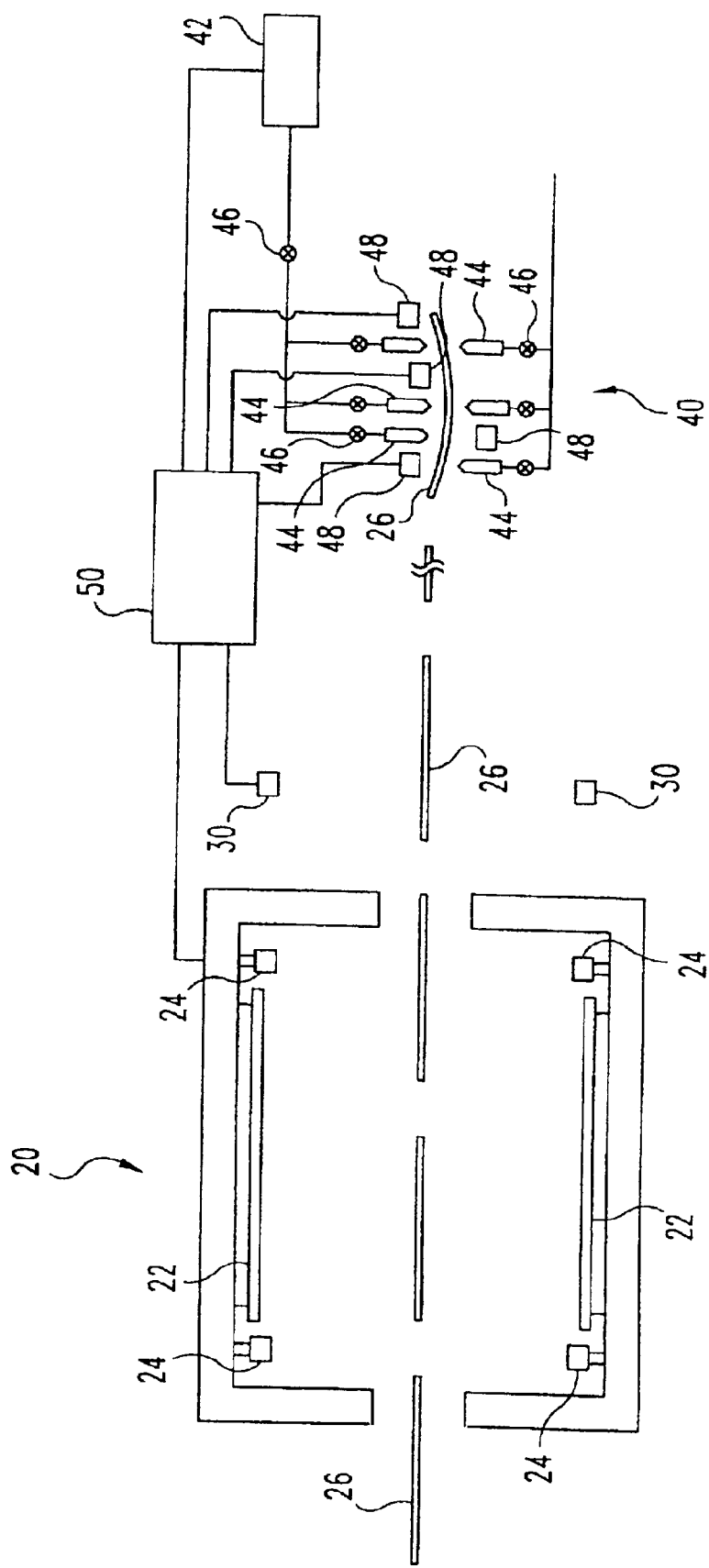
FIG. 1 is a schematic illustration of a glass processing system according to an embodiment of the present invention.

In one preferred embodiment, the method of the present invention utilizes the fluorescence emission of a component of glass products to provide a temperature measurement in glass sheets. In one refinement the temperature is determined in a spatially resolved manner including at least approximately the center of the glass sheets. In one refinement fluorescence emission of iron and/or a lanthanide is excited and detected. Variations in properties of the fluorescence emission are then used to determine the spatially resolved temperature distribution throughout the glass sheet. In another refinement, the excitation source is substantially continuous and the intensity ratio of the fluorescence emission and the scattered excitation light is correlated to temperature. In still further refinements, the temperature is determined and used to evaluate the quality of processed glass and/or to control a processing parameter to improve the quality of processed glass.

In another embodiment a novel method for sensing the temperature of glass during a manufacturing operation is disclosed comprising subjecting glass having a first temperature to thermal changes by delivering a fluid having a second temperature to the glass, delivering an excitation beam through the fluid to excite photoluminescence in the glass, detecting the excited photoluminescence from at least one location within the glass, and determining the temperature of the glass at the at least one location from the detected photoluminescence. In one refinement the fluid is a cooling fluid, and the method includes adjusting the flow of the cooling fluid in response to the detected photoluminescence at the plurality of locations in the glass. In other refinements the cooling fluid is delivered from a plurality of orifices and the adjusting includes controlling fluid flow through the plurality of orifices. In other refinements the at least one location comprises approximately the center of the thickness of the glass. In still other refinements the excited photoluminescence from a plurality of points at varying depths in the glass is detected and the temperature of the glass at the plurality of locations is determined from the detected photoluminescence. In still other refinements the glass comprises iron or cerium and the excitation beam excites photoluminescence of the iron or cerium. In other refinements the excitation beam comprises light having a wavelength between about 300 nm and about 450 nm and/or the detected photoluminescence has a wavelength between about 600 nm and about 750 nm. In other refinements the photoluminescence is detected while the excitation beam is being delivered. In still other refinements the excitation beam is substantially continuous while the excited photoluminescence is detected and/or the method includes detecting scattered excitation light from the substantially continuous light source at the plurality of locations, and determining the temperature at the plurality of locations from the detected scattered excitation light and the detected photoluminescence In another embodiment a novel method of determining a portion of the temperature distribution in a piece of glass is disclosed comprising exciting photoluminescence of iron or a lanthanide at at least one location within the glass with a substantially continuous light source, while exciting the photoluminescence, detecting the excited photoluminescence over a predetermined time period from the at least one location within the glass, and determining the temperature at the at least one location from the detected photoluminescence. One refinement includes determining the quality of the glass from the determined temperature and adjusting an operating parameter, such as a heating or cooling rate based on the quality of the glass. In another refinement a set of predetermined temperature ranges are established for acceptable glass product and said evaluating compares sensed temperatures to the set of predetermined temperature ranges, and further comprising rejecting glass products with sensed temperatures outside the predetermined temperature ranges. In still another refinement detecting the excited photoluminescence at the plurality of locations includes imaging the excited photoluminescence onto a segmented detector and the method includes correlating the response from one or more segments on the detector with one or more of the plurality of locations. In yet another refinement the method comprises detecting scattered excitation light from the plurality of locations and comparing the detected scattered excitation light with the detected photoluminescence.

In still other embodiments a system for processing glass is disclosed comprising a furnace for heating glass products to a workable state, a quenching assembly for cooling the glass and causing temperature gradients to be present within the glass, at least one temperature sensing assembly, the sensing assembly comprising a light source and a detector, the light source adapted to deliver a beam of excitation light to the glass to excite photoluminescence from at least one location in the glass, the detector adapted to produce at least one signal in response to sensed photoluminescence emitted from the at least location in the glass, a processor connected to the detector, the processor adapted to interpret the at least one signal to evaluate the temperature of the glass at the at least one location and produce at least one output control signal, and a controller adapted to control the temperature of the glass, the controller operable in response to the output control signal.

In another embodiment a method of processing tempered glass comprises heating the glass to an elevated working temperature, cooling the glass to a lower formed temperature at a quenching station, sensing the temperature profile of the glass at the quenching station by exciting photoluminescence in the glass at a plurality of locations at varying depths in the glass, detecting the excited photoluminescence at the plurality of locations, determining the temperature at the plurality of locations from the detected photoluminescence, evaluating the quality of the glass based on the sensed temperature profile. One refinement includes adjusting an operating parameter, such as a heating or cooling rate based on the quality of the glass. In another refinement a set of predetermined temperature ranges are established for acceptable glass product and said evaluating compares sensed temperatures to the set of predetermined temperature ranges, and further comprising rejecting glass products with sensed temperatures outside the predetermined temperature ranges. In still another refinement detecting the excited photoluminescence at the plurality of locations includes imaging the excited photoluminescence onto a segmented detector and the method includes correlating the response from one or more segments on the detector with one or more of the plurality of locations. In yet another refinement the method comprises detecting scattered excitation light from the plurality of locations and comparing the detected scattered excitation light with the detected photoluminescence.

In another embodiment, a novel temperature sensor is disclosed comprising a source of an excitation beam, the source comprising a source of excitation light and focusing optics to focus the beam through a piece of glass to form an excitation region within the glass, and a detector assembly comprising imaging optics and at least first and second segmented detectors, the imaging optics adapted to image light from the excitation region within the glass onto the first and second detectors, wherein the first detector detects the excited photoluminescence from the excitation region, one or more of the segments of the first detector receiving light from the imaging optics corresponding to one or more locations at varying depths in the glass. In further refinements the sensor is used with one or more of the methods disclosed herein and/or the second detector detects scattered excitation light.

DESCRIPTION OF PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Turning now to FIG. 1 a glass processing system is shown. Glass sheets 26 are conveyed through a furnace 20 which includes heating elements 22. The sheets can be conveyed in any conventional fashion, for example along rollers (not shown), on a bed of air, while floating on molten tin, or while suspended at their edges by tongs. Upon reaching the desired temperature the sheets are conveyed to a quenching station 40. At the quenching station or elsewhere along the process, for example in the furnace or at an intermediate assembly, the glass sheets can be formed into any desired shape as is known in the art.

At the quenching station a plurality of nozzles 44 are configured to direct a cooling fluid onto one or more sides of the sheet 26 to cool the sheet 26. Quenching controller 42 directs the supply of the cooling fluid, which can be pressurized air or any other known cooling fluid such as an air water mixture, and operates valves 46 to control the flow of fluid through nozzles 44. Controller 42 can operate nozzles and valves 46 to vary the quenching pattern according to a predetermined formula, varying quenching variable such as flow rate, fluid temperature, nozzle angle, and nozzle distance from glass. In addition, controller 42 can receive a set point adjustment or other signal from controller 50 to adjust one or more of the quenching variables.

Also located at the quenching station are a plurality of sensors 48 located on both sides of the glass, though in other embodiments a single sensor on a single side could be employed. As described more fully below, sensors 48 detect excited photoluminescence and provide a signal(s) to processor 51 (see FIG. 2). Processor 51 determines temperature profile information concerning the glass from the detected photoluminescence and provides an output signal(s) to controller 50, for example an output representing the glass temperature at varying depths from a surface of the glass. Controller 50 receives the temperature profile information and compares it to a desired temperature profile or profile range, signaling controller 42 to adjust a quenching variable to bring the temperature profile into accordance with the desired temperature profile or range. For example, the controller can assure that the quenching rate stays within desired limits so as to assure that the glass is not deformed from its desired shape.

Preferably, controller 50 receives substantially real time temperature profile information and adjusts one or more quenching variables in response to the time resolved temperature profile information. Controller 50 can adjust the quenching variables during the quenching operation of a particular glass sheet 26 in response to the sensed temperature profile of that glass sheet. Alternatively, controller 50 receives temperature information from one or more of a series of glass sheets 26, for example averaging the temperature profiles for the series of sheets, and adjusts quenching variables for subsequently processed sheets 26.

In addition, the system of FIG. 1 includes additional temperature sensors 30 and 24. Sensor 30, which can be identical to sensor 48, also senses temperature profile information but as the sheets exit the furnace 20. Sensors 24, which can also be identical to sensor 48 or to any conventional temperature sensor, senses the temperature of glass sheets 26 while they are in the furnace. Sensors 24 and 30 each also communicate with controller 50 to provide temperature information at other stages of the glass processing operation.

Controller 50 can adjust additional process parameters in response to any of the sensed temperature information. For example, if the temperature of sheets 26 is too high or too low, or the temperature profile is too steep or flat as the sheets 26 exit the furnace, controller 50 adjusts the furnace temperature or the residence time of sheets 26 in the furnace. In addition, though it presumably would be less representative of the glass temperature at the quenching station 40, temperature profile information from sensors 30 and 24 can be used in place of or in addition to information from sensors 48.

Further, if temperature profiles from the furnace are outside acceptable parameters, the controller may reject the glass sheets. Preferably, operating personnel would be notified of the adverse operating conditions to perform manual adjustments.

Figure 2:
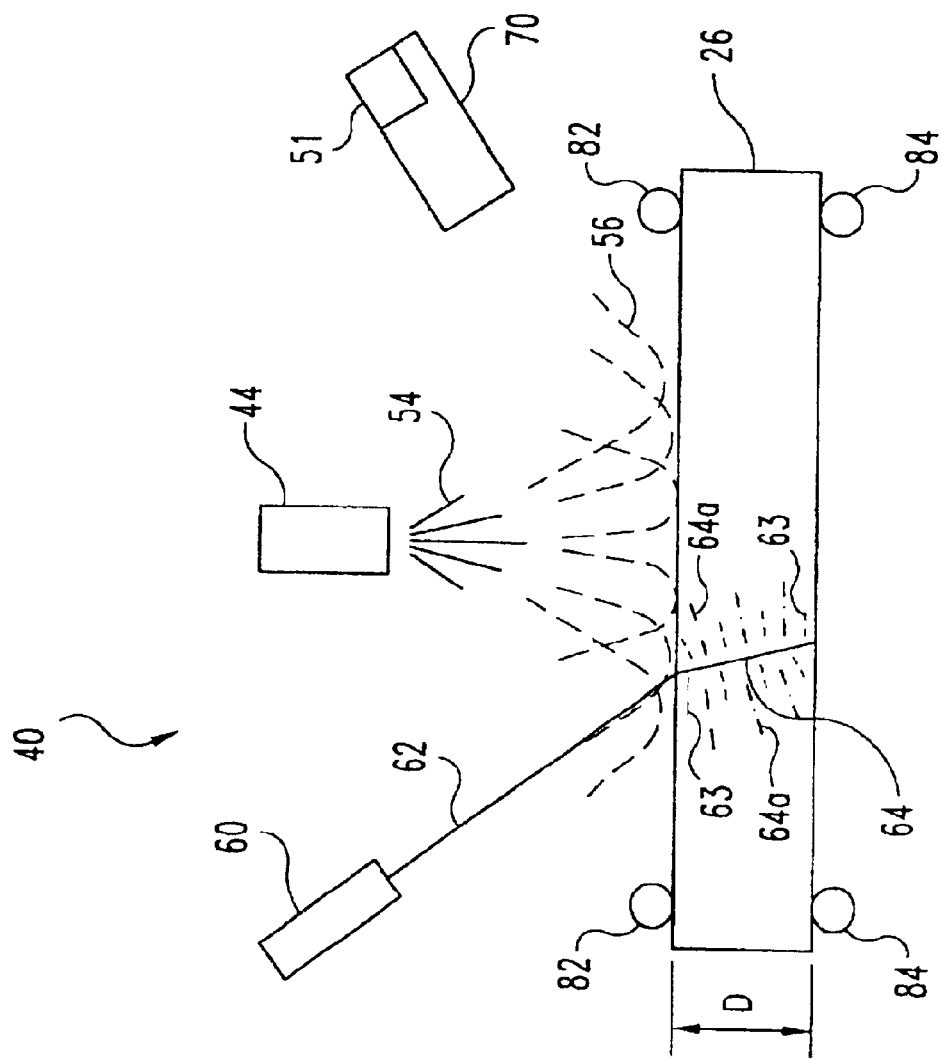
FIG. 2 is a schematic illustration of a sensor at the quenching station according to FIG. 1.

Turning now to FIG. 2, more particular aspects of quenching station 40 and the sensors 48 are illustrated. Sensor 48 includes an excitation source 60, which produces an excitation beam 62 and focuses it onto the glass sheet 26. Beam 62 is of adequate power and wavelength to penetrate the entire thickness or depth D of glass sheet 26 and to produce a zone of excitation 64. Zone 64 is preferably a thin pencil like region of excited photoluminescence. The photoluminescence emanates from zone 64 in all directions. Sensor 48 also includes detector 70 positioned a distance away from the glass and in line of sight to substantially the entire length of zone 64 to capture the excited photoluminescence. As described more fully below, sensor 48 uses the excited photoluminescence to determine the temperature profile in zone 64 and consequently across thickness D. Upper and lower supports 82 and 84, for example rollers, can optionally be provided to help assure proper alignment of glass sheet 26 and sensor 48.

Sensor 48 is configured to be operational to sense the temperature profile in sheet 26 during the quenching operation. Excitation source 60 and detector 70 are spaced away from the sheet 26 to allow nozzle 44 access to sheet 26. It is envisioned that nozzles 44 can be moveable in relation to the sheet in all directions, including bidirectional movement parallel to the sheet surface as well as movement closer and farther from the sheet and between different angular orientations relative to the sheet. Sensor 48 is positioned to allow free movement of nozzles 44 along substantially the entire surface of sheet 26. In one aspect, source 60 and detector 70 can also be moveable, for example being mounted on rails, to scan a volume of the sheet 26. In addition, while source 60 and detector 70 are singly shown on the same side of sheet 26, they could be on different sides and/or multiple detectors 70 can be provided for each source 60.

In operation, nozzle 44 directs a cooling fluid stream onto the surface of sheet 26. The fluid stream can be considered to include an initial spray portion 54 and a reflected portion 56 caused by the initial stream 54 impinging upon and deflecting off the sheet surface. The fluid stream rapidly cools the glass sheet 26 and causes temperature gradients to form within the sheet 26 and the cooling stream. Both the excitation beam 62 and the excited luminescence 63 received by detector 70 can travel through a portion of the stream and the temperature profile information can still be determined by processor 51. In this way, temperature information can be obtained from sheet 26 during the quenching operation.

Figure 3:
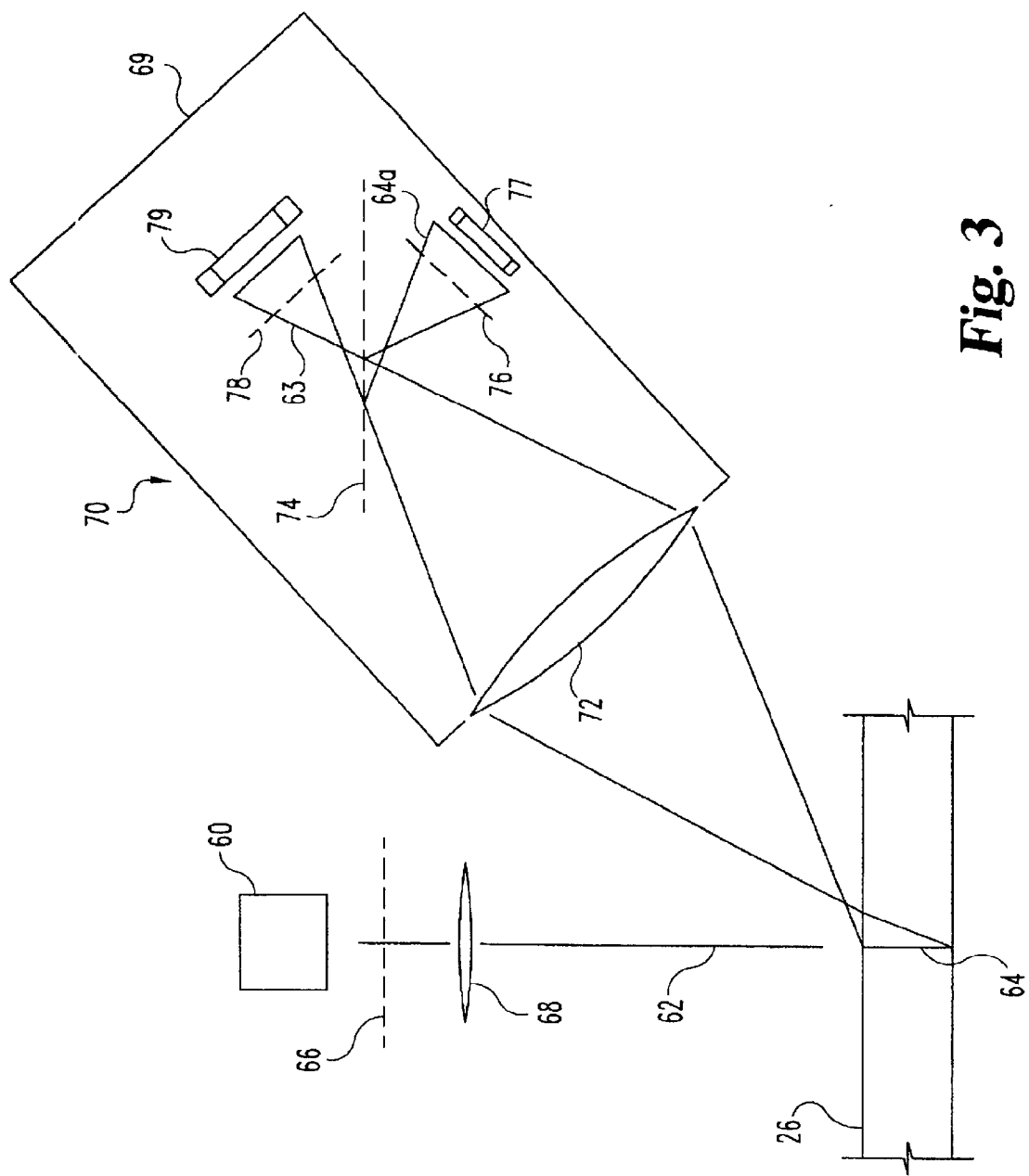
FIG. 3 is a schematic illustration of a through thickness temperature sensor according to an embodiment of the present invention.

Turning now to FIG. 3, more particular features of sensor 48 are shown. Excitation light source 60 provides an intense beam, for example about 1 Watt, and includes light at the appropriate wavelength. The wavelength can be selected to excite photoluminescence of a species in the glass. When the species is iron, the wavelength is between about 300 and 450 nm, more preferably between about 360 and 390 nm or between about 420 and 450 nm, and most preferable about 380 nm.

Source 60 is a mercury vapor lamp providing high intensity continuous light, but source 60 could optionally be an ultra violet light, light emitting diode, laser or other source of light of the desired wavelength. Optionally source 60 may also include a mechanical or electromechanical means for periodically chopping the beam or otherwise modulating the signal. The light is focused into a beam 62 through focusing optics 68 after passing through a filter 66 (or series of filters) to select the appropriate wavelength range. It is not necessary to produce a coherent beam or a beam containing a narrow wavelength band, though preferable beam 62 does not contain light at or near the wavelength of the excited photoluminescence. As an example, the wavelength range of beam 62 can be about 100 nm wide or more preferably about 25 nm wide. The wavelength range can be wider or more narrow depending on the width of the absorbance band of the species to be excited.

Beam 62 is steered and focused on the surface of the glass sheet 26. Beam 62 impinges on glass sheet 26 and produces intersection region 64, which is approximately cylindrical through the glass thickness D. Fluorescence emission 63 and scattered excitation light 64a emerge from region 64.

Some of the light emitted from region 64 is collected and imaged with an optical system. Imaging lens(es) 72 direct and image the light onto a pair of detector arrays 77 and 79. The light emitted from region 64 passes through a dichroic beam splitter that separates the excitation light 64a from the beam while passing the fluorescence light 63, which is of longer wavelengths. The light going to each segmented detector 77 and 79 (which as used herein includes a detector array or a plurality of individual detectors) additionally passes through one or more narrow band interference filters 78 and 76 to remove stray light or noise from each image and to select the appropriate wavelength to detect. The choice of detector can also assist in selecting the wavelength if it is selectively sensitive to certain wavelengths. In the case of iron fluorescence, the fluorescence signal to be detected is between about 600 nm and 750 nm, more preferably between about 650 nm and 700 nm, and most preferably about 670 nm. In the case of cerium fluorescence, the wavelength can be between about 400 nm to 460 nm. Other elements could have other fluorescence wavelength bands.

Each of the segmented detectors 77, 79, for example a photomultiplier array, is placed at the image plane for both images, allowing spatially resolved measurement of the light intensity coming from different depths within sheet 26. The entire detector assembly, including lens(es) 72 and detectors 77 and 79, is contained in a housing 69 to isolate the instrument from stray light.

As described in more detail below, at constant excitation the strength of the resultant fluorescence varies with the temperature of the excited medium. Accordingly the temperature at a particular location in the glass is correlated to the DC signal level recorded by the fluorescence detector 79. Preferably, the ratio of the signal recorded from detector 79 (representative of fluorescence 63) to the signal recorded at detector 77 (representative of scattered excitation light 64a) at similar detector segments is taken. This ratio also is correlated to temperature and takes into account fluctuations in signal due to, for example, lamp intensity or dirty or coated optics. In addition interference, noise, and/or signal attenuation due to the path of the excitation and emission light through the cooling fluid and various portions of the glass sheet is at least partially accommodated by this technique.

The detector 70 can pass a set of analog or digital signals to processor 51 representative of the relative or individual detector outputs. The processor 51 determines the relative fluorescence intensity and consults, for example, a look up table of relative fluorescence intensities to obtain the corresponding temperature at each location. This temperature information can be stored in memory with the corresponding time of the measurement and other related process variable, such as the particular type of glass being processed, for later analysis. The temperature information is also passed to controller 50.

A look up table is preferably derived by calibrating a fluorescence property of the glass to temperature for the particular glass type being processed. In a preferred embodiment, the relative fluorescence intensity is measured at an independently measurable location, such as the surface of the glass. Concurrently therewith the temperature at that location is measured by independent means, such as an optical pyrometer or any other temperature sensor, and the measured temperature correlated to the sensed relative fluorescence in the look up table.

As an alternative to determining absolute temperature with sensor 48, the temperature at a know point of the glass, such as the surface, can be measured by any other means. The temperature profile relative to this known temperature can then be determined from the relative output of detector 70 as between the corresponding known location and any other location within the glass. In this embodiment, sensor 48 determines a temperature difference between one or more locations in the glass by consulting the look up table based on the output of detector 70. This difference is then applied to the temperature at the know point to determine the temperature at other points in the glass. In still other variations, only the center temperature is determined by detector 70 and it is compared to the surface temperature determined through any known means to determine the profile.

Where a pulsed or modulated light source is used, as described below, fluorescence lifetimes could also be calculated and correlated to temperature. For example, with appropriate timing electronics, the output of detector 79 can be used to obtain the lifetime by analyzing the time decay of the signal after a pulse excitation. Alternatively, the phase difference of the fluorescence signal from the phase of a modulated excitation signal could be used to extract the fluorescence lifetime. In either of these later embodiments, information regarding the excitation source, for example the pulse timing or the modulation frequency and timing can be directly obtained from source or it could be derived from measurements of the scattered excitation light at detector 77.

Once temperature profile information is obtained an operator, or controller 50, can compare this profile information with predetermined desired profiles, as discussed above, for process control. Alternatively or in addition, the temperature profile information can be used to determine the quality of glass produced. When the temperature profile is sensed during the quenching step, the temperature profile at a particular instant in the quenching process can be determined from a time history of the temperatures at the various depths in the glass. The time history has previously been saved in memory by processor 51. When this instant or instants is related to a glass transition, such as the point when stresses are locked into the tempered glass and/or the point when glass passes though the annealing range, quality determinations or estimations can be made.

Based on the determined temperature profile during the critical time when stresses are locked into the glass, the stresses actually locked into the glass are calculated. Alternatively, the quality of glass of sensed temperature profile and history can be determined through any known method and provided as a look up table. By relating the temperature profile at a predetermined period (the moment of stress lock) to the final stresses, the resultant safety and quality of the glass can be determined by comparing the determined stresses to minimum and maximum stresses necessary for adequate strength and shattering parameters. Most preferably, for a particular type of glass, a desired temperature profile range during the critical period is determined and controller 50 set to achieve that profile range. As an example, this profile range can be expressed as a predetermined desired maximum and minimum difference between the center glass temperature and a surface temperature.

Having described the general operation and configuration of the system and sensors of the present invention, more particular aspects of the sensors relating to the choice of excited species and the detected wavelength are disclosed. While specific experiments and scientific theories are presented, it is understood that no limitation in scope is hereby intended.

Many glass products include $Fe_2O_3$ as an additive in various amounts. The transmission of the glass both within the ultraviolet (UV) range and in the infrared (IR) spectral range is affected by the iron ions present within the glass. In the case of automotive glass, it is desirable to reduce transmission of both of these bands in order to minimize damage to automotive interiors (UV) and to reduce the thermal load for air conditioning systems (IR).

For example, typical soda-lime float glass is composed largely of $SiO_2$ (72% by weight), $Na_2O$ (14%), CaO (9%), MgO (4%), and $Fe_2O_3$ (1%). The compositions vary somewhat depending on manufacturer and intended use, especially in the addition of other trace chemicals. Nominal compositions of three automotive glasses manufactured by Visteon Glass Division of Ford Motor Company are shown in Table 1.

TABLE 1

Nominal compositions (by weight) of Tint, Solar Tint, and Batch Privacy glass.

|  | TINT | SOLAR TINT | PRIVACY |
|---|---|---|---|
| $SiO_2$ | 72.23 | 72.45 | 71.6 |
| $Na_2O$ | 13.6 | 13.69 | 13.7 |
| CaO | 8.75 | 8.44 | 8.45 |
| MgO | 3.89 | 3.55 | 3.5 |
| $Al_2O_3$ | 0.6 | 0.6 | 0.6 |
| $Fe_2O_3$ | 0.55 | 0.89 | 1.55 |
| $SO_3$ | 0.24 | 0.22 | 0.18 |
| $K_2O$ | 0.12 | 0.12 | 0.13 |
| $TiO_2$ | 0.011 | 0.045 | 0.02 |
| $MnO_2$ | 0 | 0 | 0.25 |
| Se (ppm) | 0 | 0 | 29 |
| Co (ppm) | 0 | 0 | 175 |
| Total | 99.991 | 100.005 | 99.98 |

These glasses, termed Tint, Solar Tint, and Batch Privacy, are used as automotive windshields, sidelights, and backlights for Ford and other brands of vehicles. Unless indicated otherwise, the experiments described herein were performed with Tint, Solar Tint, and Batch Privacy samples though it is understood that, unless otherwise indicated, the present invention is applicable to other types and compositions of glass as would occur to those of skill in the art. Moreover, the samples were obtained from standard production runs and thus the compositions are only approximately as shown in Table 1. In certain cases glass samples of precisely known composition were constructed under laboratory conditions with high purity materials. These samples are referred to herein as the high purity samples.

Figure 4:
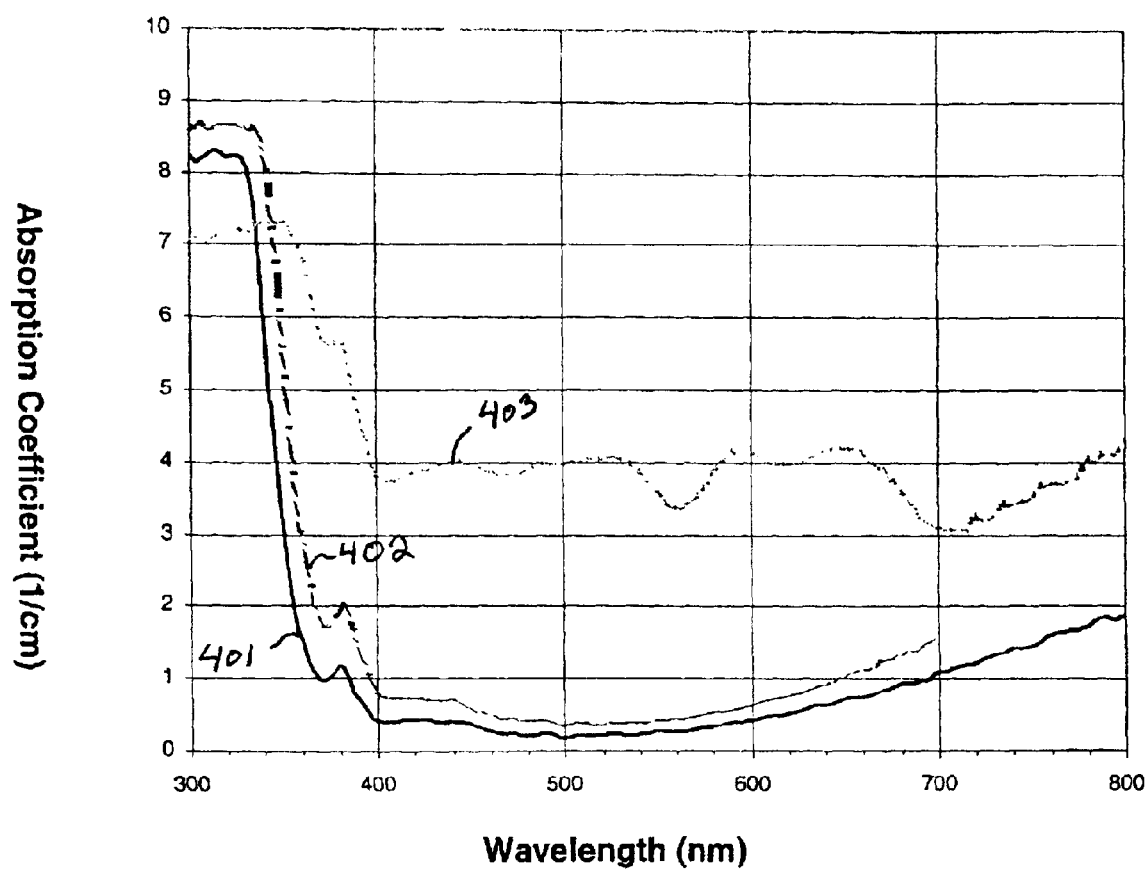
FIG. 4 is a plot of the light absorption coefficients for glass samples as a function of temperature.

In the wavelength range from about 300 nm to 1000 nm, light absorption in typical soda-lime float glass is largely due to either ferrous ($Fe^{2+}$) or ferric ($Fe^{3+}$) ions. The absorption coefficients for Tint (plot 401), Solar Tint (plot 402) and Batch Privacy (plot 403) glass samples are shown in FIG. 4. There is a local maximum in the absorption coefficient near 380 nm., which is believed to be due to absorption by ferric ions.

Experiments were performed to determine the absorption and emission properties of the glass samples. These experiments were performed with a SPEX spectrofluorometer. In one set of experiments, the samples were irradiated with light whose wavelength was scanned, while the emission was recorded at a fixed wavelength. In other experiments, the samples were irradiated at a fixed wavelength while the wavelength of the detected emission was scanned and recorded. In both of these experiments, the excitation light source was continuous and temporally resolved data were not obtained. These experiments have allowed some insight into the process by which fluorescence occurs in the glass samples.

The high purity samples had various concentrations of iron oxide, and the predominant ionic form of the iron was known since the production process was done under reducing, oxidizing, or neutral conditions. Under reducing conditions, production of ferrous ($Fe^{2+}$) ions are favored while under oxidizing conditions ferric ($Fe^{3+}$) ions are more readily produced. Quantitative information about the ratio of these species was not determined. The production methods for these samples are described in the article entitled "Absorption of iron and water in the Na2O—CaO—MgO—SiO2 glasses: part 1: separation of ferrous and hydroxyl spectra in the near IR region" published in the *Journal of Non-Crystalline Solids* 221 (1997).

Figure 5:
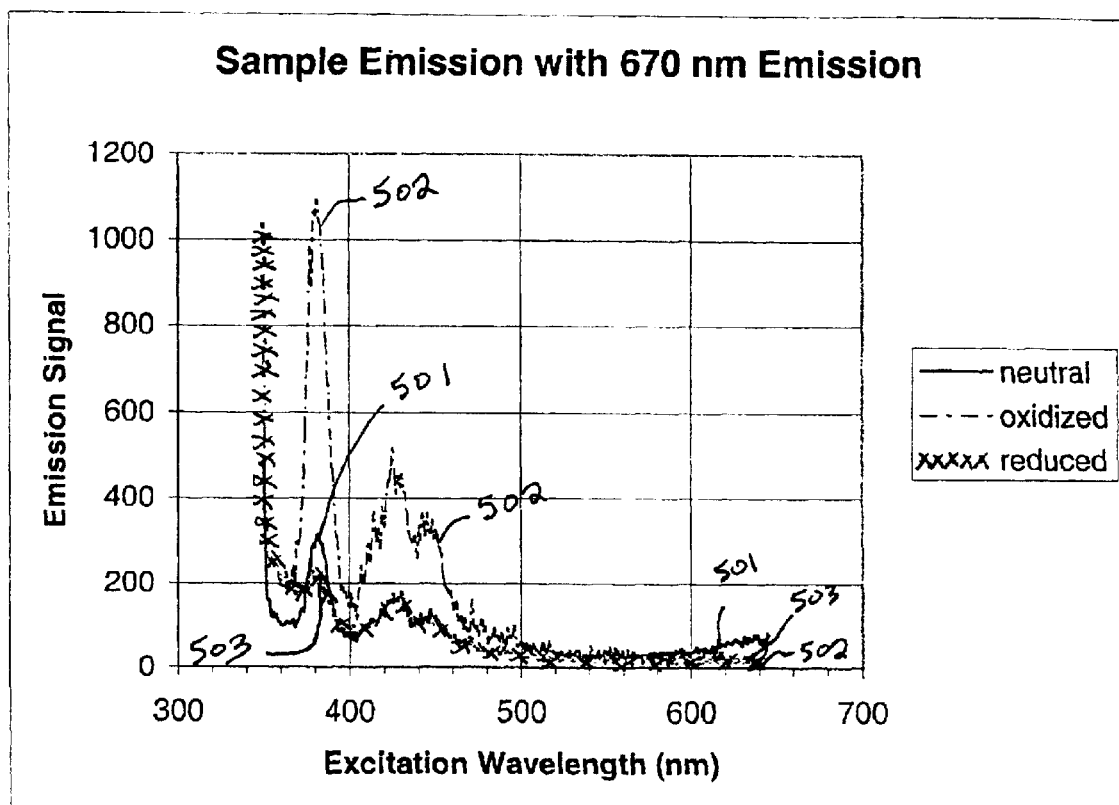
FIG. 5 is a plot of an emission signal sensed at 670 nm as a function of excitation wavelength for high purity glass samples produced under different conditions.

In FIG. 5, the emission detected at 670 nm while the excitation wavelength was scanned from 300 to 650 nm is shown. Data for this plot were acquired with three different high purity glass samples containing iron oxide at 0.2% by weight. Plot 501 represents the neutral sample, plot 502 represents the oxidized sample and plot 503 represents the reduced sample. The data show absorption peaks at about 380, 425, and 450 nm. Qualitatively, the 670 nm emission is strongest for the glass sample produced under oxidizing conditions, which it is believed contains predominantly ferric ions, whereas the sample produced under reducing conditions exhibits the least emission.

Figure 6:
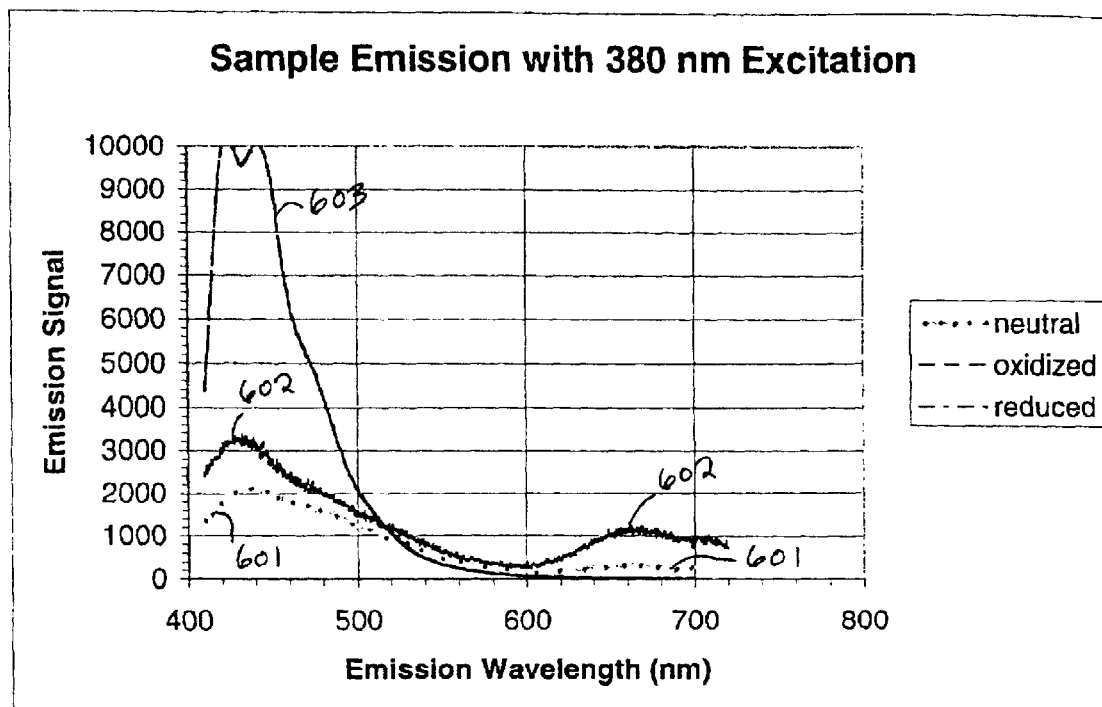
FIG. 6 is a plot of an emission signal as a function of wavelength with fixed excitation at 380 nm for high purity glass samples produced under neutral, oxidized, and reduced conditions.

In FIG. 6, the emission spectra that results when the same three high purity glass samples are irradiated at 380 nm are shown. Emission from the reduced sample (plot 603) is strongest between 400 and 450 nm and there is relatively little emission at 670 nm. Emission at 670 nm is much stronger for the neutral and oxidized samples (plots 601 and 602 respectively). Evaluation of a wide variety of data has not led to a consistent reason for the fluorescence difference, and the difference cannot clearly be correlated to the differences between ferrous and ferric ion concentration. While not intending to be bound to any theory of operation, it is believed to be due to differences in the structure of the glass matrix.

Figure 7:
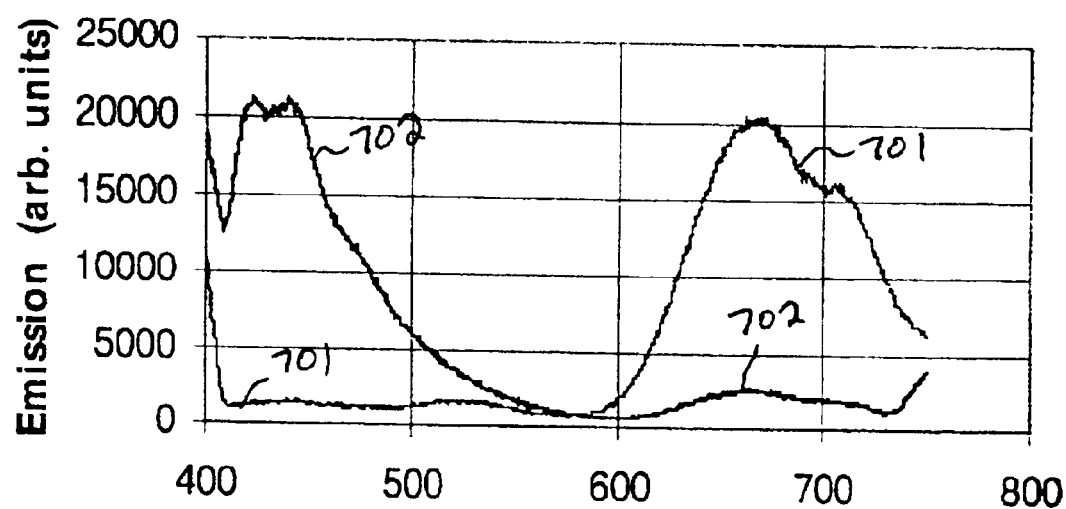
FIG. 7 is a plot of the emission signal as a function of wavelength with fixed excitation at 380 nm for glass samples.

Utilizing the spectrofluorometer, we performed similar experiments with Tint, Solar Tint, and Batch Privacy samples. The resulting emissions observed when the samples were irradiated at 380 nm are shown in FIG. 7 for the Tint (plot 701) and Solar Tint (plot 702) samples. The Tint sample shows fluorescence predominantly at 670 nm while the Solar Tint sample fluoresces mostly at 450 nm. All of these samples were produced under similar furnace conditions. It should be noted that the Tint and Solar Tint samples differ primarily in iron content (see Table 1).

While absorption studies have shown that ferric and ferrous ions are mostly responsible for absorption in soda lime glass, very little is known about the fluorescence emissions and the mechanisms ultimately responsible for them. The ferric ion is clearly very important for light absorption at 380 nm. Fluorescence quite likely depends on the glass matrix as well as the ionic form of the iron. Since the fluorescence spectra from the high purity samples and the batch samples are quite similar, it is not likely that other glass additives or impurities are responsible for the emission. Hence, many soda lime glasses containing iron are very likely to exhibit the same general fluorescence observed in the above-described experiments.

In implementing the present invention, it may be necessary to test any individual type of glass for its fluorescence behavior, since it may be that certain additives can suppress or quench fluorescence. For instance, we observe that the Batch Privacy sample, which is basically similar to the other glass samples except that it contains modest amounts of cobalt and significantly higher iron content, does not fluoresce with the same time signature as the other two samples and, additionally, does not fluoresce as strongly.

Additional experiments were performed to relate a fluorescence property to the temperature in some manner. A setup schematically identical to FIG. 2, save the exclusion of nozzle 44 and the inclusion of an oven under the glass sample was used. A pulsed nitrogen laser was used to pump a dye laser, whose output was adjusted to 380 nm, through manipulations of the dye laser cavity. The dye laser light was directed by means of mirrors to a glass sample. Samples of Tint, Solar Tint, and Batch Privacy glass were tested. All samples were about 0.3 cm in thickness and 1.5 cm×1.5 cm in cross section. The light passed through the 0.3 cm thickness of glass at an angle of about 40 degrees from the normal. After passing through the glass, the remaining laser light entered a beam dump drilled into the top of the oven, which was located below the sample with the laser and detector above the sample.

Fluorescence light originated and propagated from a small pencil-like region of glass through which the dye laser beam passed. A fraction of this light was collected with an optic and focused onto the plane of a segmented photomultiplier tube (PMT). The PMT had an active area of about 16 mm by 16 mm and was segmented into 16 channels, each channel being 1 mm×16 mm in area. Since the fluorescence emission is imaged, light from various depths within the glass was focused onto various segments of the detector. Three of the 16 segments were used, collecting fluorescence light emanating from near the top, middle, and bottom of the glass sample. The remaining 13 PMT channels were unused. Signals from each PMT channel first passed through a high gain current preamplifier before going to an oscilloscope for time resolved collection.

The dye laser pulse length was about 3 ns and the energy per pulse was about 50 $\mu$J. The pulse repetition rate was 16/s. The dye used for the laser was BPBD-365 which was manufactured by Exciton, Inc. The spectral width of the pulse was about 1 nm. No attempt was made to produce a beam of very narrow line width, since the glass absorption peak at 380 nm is quite broad and production of narrow line width beams invariably results in greatly reduced beam power.

The glass samples were heated from the bottom and thermocouples were provided in holes drilled into the sides of the glass at various depths. Heat loss from the samples was due to convection and conduction into the room air. No attempt was made to assure any particular thermal gradient within the sample. The thermocouples provided an independent measurement of glass sample temperature at three vertical positions. During experiments, the sample temperature was adjusted until a target temperature was reached for the center of the sample. Then all three temperatures were recorded and fluorescence measurements were obtained. Typically the temperatures could be controlled to within about 3° C. of the target temperature during any single measurement.

The fluorescence light from the glass was imaged with an optical system consisting of a pair of lenses and light filters. The first lens was an f/1 plano-convex lens of 30 mm focal length. Separated from it by 43 mm was an achromatic doublet lens with a focal length of 100 mm. Both lenses featured axially varying refractive indices to reduce aberration. Filters were placed between the two lenses. These filters included two colored glass filters that passed light with wavelengths above 630 nm. Scattered laser light rejection was better than a factor of $10^6$ with the colored glass filters. The photomultiplier response drops dramatically after 700 nm, so that the effective wavelength range of light collected was from 630 to 700 nm. The object distance was adjusted so that the image distance was about 15 cm behind the second lens and the image magnification was nearly three.

Adjustment of the optical group to obtain the proper object and image distances was done by replacing the glass sample with a colored glass of nearly identical thickness and which exhibited strong fluorescence. The glass was irradiated with the dye laser beam and the fluorescence was sufficiently strong to easily obtain an image of the dye laser beam path through the glass. The detector position was adjusted so that imaged light from the top, middle, and bottom portions of the glass fell upon the correct segments of the PMT. The positions of the optics and detector were then fixed and an actual glass sample replaced the colored glass. Finally, a copper enclosure was built and installed around the optics, filters, detector, and preamplifier assembly in order to reduce interfering noise to an acceptable level.

In performing the experiments, light from the dye laser was directed onto the glass sample and the light emission at wavelengths longer than 630 nm was recorded on three channels of the 16 channel PMT. The output signals from the PMT ran first through a current preamplifier with a gain of $5 \times 10^4$ volts/ampere before going to the input terminal of a four channel digital oscilloscope. Oscilloscope triggering was provided by a photodiode which sampled scattered laser light. For each laser shot, the time resolved signal from each of the three PMT channels was recorded. Each recorded trace was an average of 200 laser shots. Typical recording time for one trace was about 1 minute. This recording time was convenient for experimental purposes. Most preferably the integration time can be reduced to about one second in order to observe fast thermal transients associated with thermal quenching of tempered products. This time requirement could be met by utilizing a much higher power laser (for instance, a pulsed, frequency doubled Alexandrite laser) operating at an improved repetition rate. The data were stored in the oscilloscope memory buffers and then subsequently transferred to a dedicated PC for storage in data files. Data were recorded with 16-bit precision.

An experiment would begin with the glass sample at room temperature. After collection of data, the temperature of the oven would be increased to predetermined levels beginning at 50° C. and increasing by 50° C. for each subsequent measurement. The final temperature was typically around 550° C. Then data would be recorded as the temperature was decreased from 500° C. to 100° C. in 50° C. increments. The glass temperatures as recorded with the thermocouples typically varied by about 3° C. during each measurement. The average temperature for each thermocouple was recorded with each data set. As expected, a thermal gradient existed within any tested glass sample, with the bottom of the sample being warmer than the top. The gradient increased with increasing average temperature.

Figure 8:
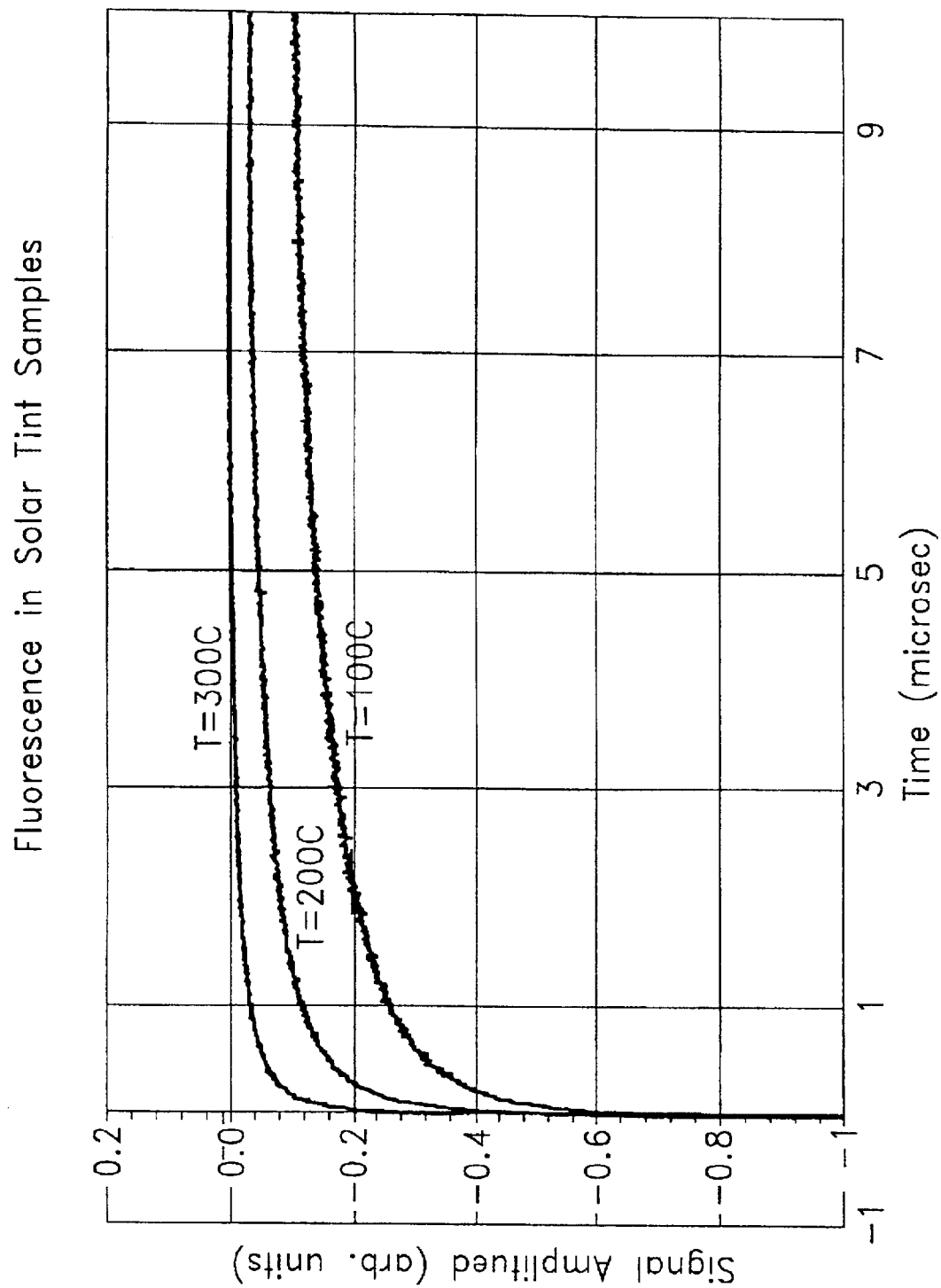
FIG. 8 is a plot of time resolved fluorescence signal amplitudes obtained at several temperatures for a glass sample.

Typical spectra obtained for the Solar Tint sample at 100, 200, and 300° C. are shown in FIG. 8. The red fluorescence is seen to have a persistence time which decreases with increasing temperature. The magnitude (peak signal) of the fluorescence is also seen to diminish with increasing temperature. When utilizing a continuous or substantially continuous light source as described in certain embodiments above, it is believed that this magnitude variation with temperature provides at least a portion of the temperature correlated signal. However, in the determinations of lifetimes described below, analysis excluded the region in time occupied by the initial pulse.

Figure 9:
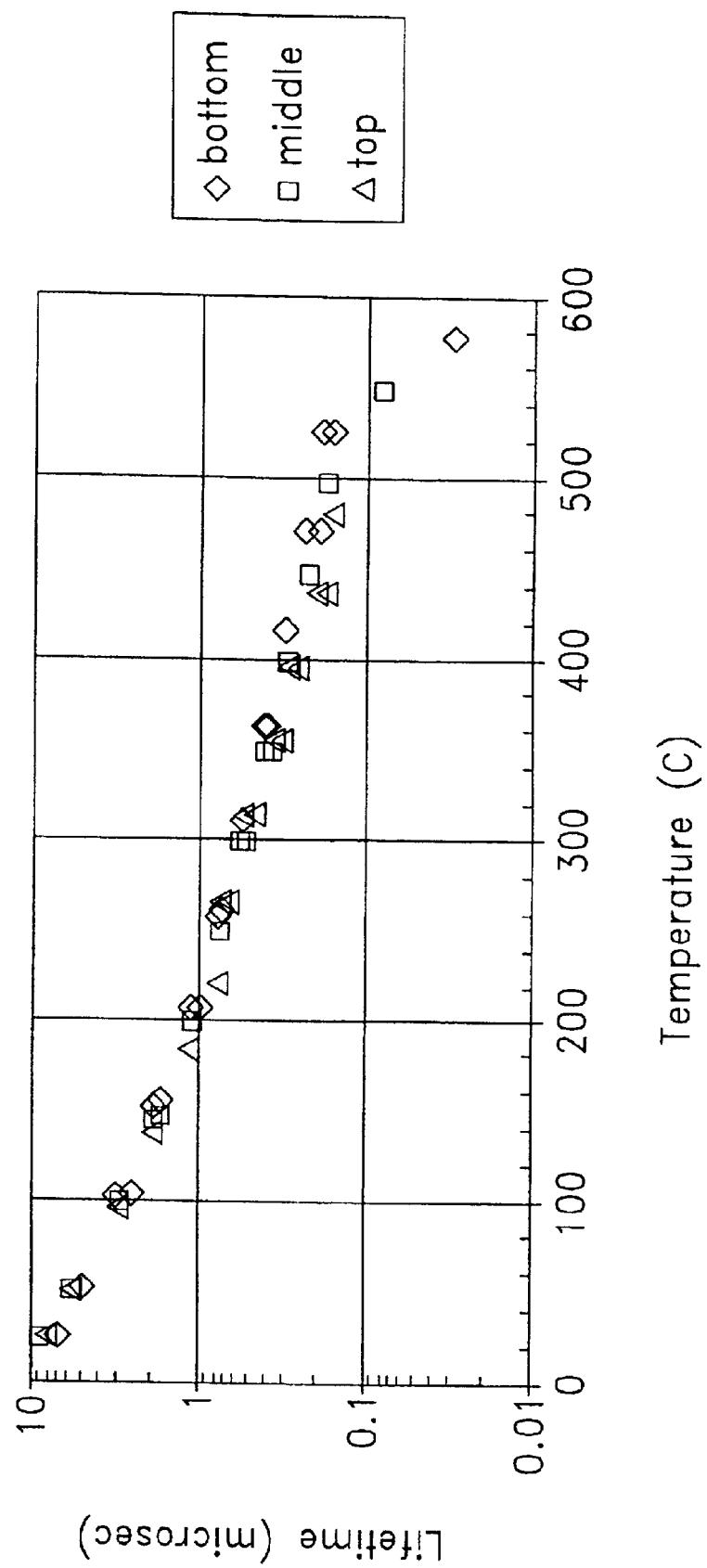
FIG. 9 is a plot of fluorescence lifetime in microseconds as a function of temperature for a glass sample.

If we define the fluorescence lifetime as the time required for the signal to fall from its peak value above baseline to 1/e of its value above baseline then we can determine fluorescence lifetime as a function of temperature from plots such as shown in FIG. 8. A plot of fluorescence lifetime as a function of temperature is shown in FIG. 9 for the Solar Tint glass sample. The fluorescence lifetime at each monitored glass location can be determined by any known method of determining lifetimes for an exponentially decaying signal after a pulse excitation.

One approach, know as the two point time constant approach, compares the signal intensity at two points along the exponential decay curve after the excitation pulse has terminated. The circuitry employed to do this is designed, as is known in the art, to measure first the value of the decaying signal, Io, that occurs at a fixed time $t_1$ after the termination of the excitation pulse. A second intensity level, a value of Io/e, is then calculated and established as a reference. When the decaying signal falls to that level, the time $t_2$ at which crossover occurs is noted. The interval between $t_1$ and $t_2$ is the lifetime $\tau$. Other approaches can utilize the integration of the decaying signal over different periods of time to extract the fluorescence lifetime.

Other approaches to obtaining the fluorescence lifetime can use a modulated rather than a pulsed light source. For example, a sinusoidally modulated light source can be used and the lifetime derived from the detected phase shift of the fluorescence response as described in *Fiber Optic Fluorescence Thermometry*, by Grattan and Zhang, Chapter 1 of which is hereby incorporated by reference for the teaching of determining fluorescence lifetimes.

Detailed knowledge of the fluorescence process in iron-doped glass samples is not presently well known nor is the present invention intended to be limited to any particular fluorescence mechanism or theory of operation. Moreover, it is beyond the scope of this disclosure to address detailed questions of absorption and emission of light by iron-doped glass. However, an extremely simplified model can be constructed and tested against the data. Upon absorption of light by a ferric ion in a glass matrix, the energy must be dissipated in some manner. Competing channels include radiative and radiationless transitions to other energy states. Radiationless transitions occur through coupling of the excited state to the phonon field of the surrounding lattice. With increasing temperatures, radiationless transitions become more important as the occupation number of high-energy phonon modes increases. It is possible for phonons to result in a transition to either a higher or lower energy state. The subsequent decays from these other states are not observed in the present experiments. Only radiative transitions are observed at about 670 nm and the emitted light diminishes with increasing temperature and the fluorescence lifetime also becomes shorter.

The temperature dependence of the fluorescence lifetime will depend on the mechanism by which the relevant excited states become de-populated. There are probably a multitude of non-radiative transitions that could be mediated in the glass in a way that produces the observed temperature dependence, and it is not possible to arrive at a most likely mechanism from the data at hand. With this disclaimer, the simplest mechanism has been considered: The excited state formed by absorption of light at 380 nm interacts with the phonon field to transition to either a higher or lower energy state by absorption or emission of a phonon. The new excited state then would decay unobserved to the ground state or another lower energy state. In this model the fluorescence emission at 670 nm would diminish since the population of fluorescing states becomes depleted due to interaction with the phonon field. For such a process the transition rate will depend directly on the occupation number for the phonon mode, which, for phonon energies much larger than kT, is given by $$n(T) = \exp(-h\nu/kT), \qquad (1)$$

where h is Planck's constant, $\nu$ is the frequency, k is Boltzmann's constant, and T is the absolute temperature.

Hence the transition rate, R, which is proportional to the phonon occupation number, is given by $$R = R_0 \exp\left(\frac{-E_a}{kT}\right) \qquad (2)$$

where $E_a$ is the activation energy which must be thermally supplied and $R_0$ is a constant of proportionality. The excited state is then de-populated by phonon interaction and by radiative decay. We assume that the radiative decay rate from the initial excited state is much smaller than the rate at which phonons de-populate the state, so that the phonon rate alone adequately describes the process. Since R is inversely proportional to the lifetime $\tau$ we obtain after some manipulation $$\ln \tau = \ln \tau_0 + \frac{E_a}{kT} \qquad (3)$$

Figure 10:
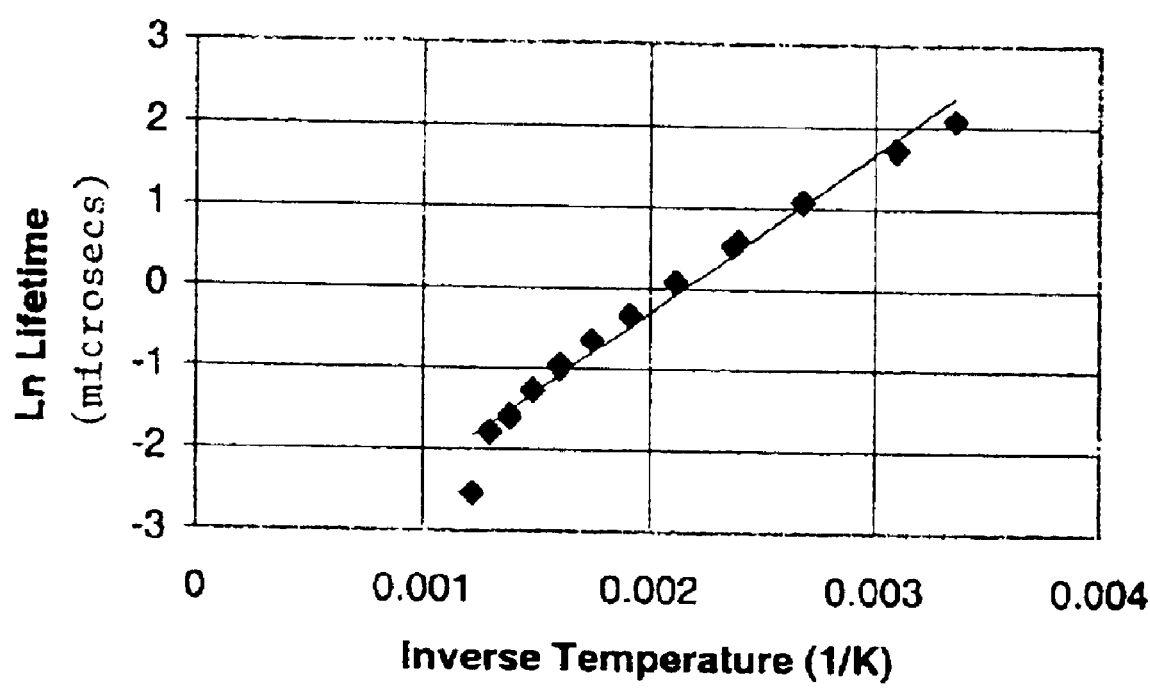
FIG. 10 is a plot of the logarithm of the fluorescence lifetime in microseconds against inverse Kelvin temperature for a Solar Tint glass sample with a best-fit linear plot.

Thus, a plot of log $\tau$ vs (1/T) should yield a straight line with slope ($E_a$/k). The data are plotted as described for the Solar Tint sample in FIG. 10. The line slope gives $E_a=2.7 \times 10^{-20}$ joules (0.17 eV). Similar data for Tint and Batch Privacy glass samples provide $E_a=2.3 \times 10^{-20}$ joules (0.15 eV) and Ea=$7.7 \times 10^{-21}$ joules (0.05 eV) for Tint and Batch Privacy glass, respectively. For oxide glasses, the energies of the highest frequency vibrations correspond to phonon energies in the range from 0.09 to 0.17 eV, so that the activation energies are fairly consistent with the energies available from single phonons in typical glasses. It is seen that the experimental fluorescence data are consistent with this simplified mechanism.

Figure 9B:
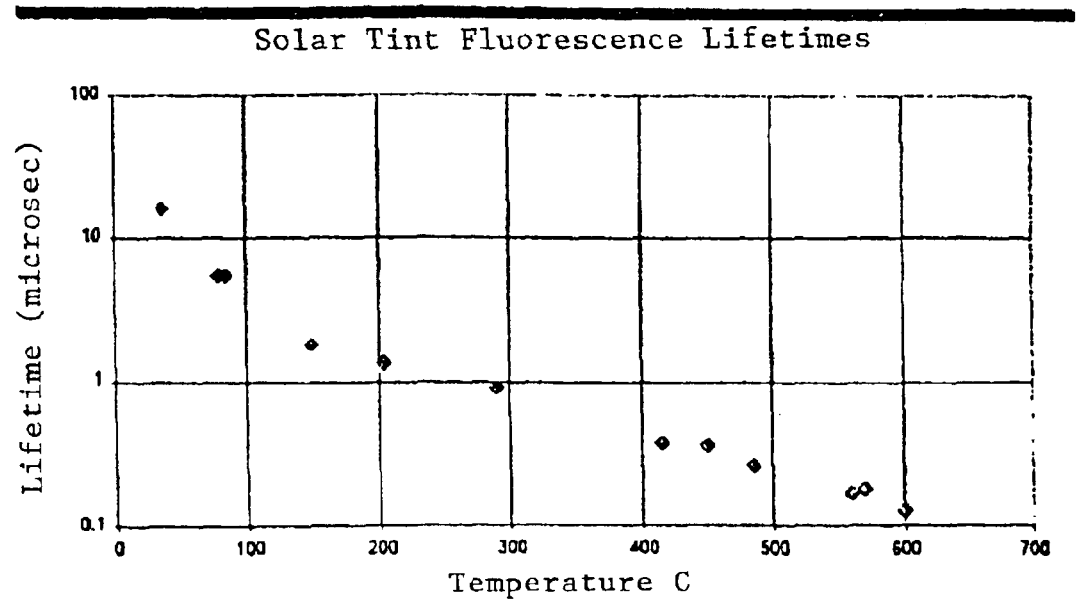
FIG. 9B is a plot of fluorescence lifetime in microseconds as a function of temperature for a glass sample.

While some of the data presented herein show deviation from log linear behavior at higher temperatures (above 500 degrees C.) these data are from the earlier experiments where background noise became excessive at higher temperatures for the experimental setup. Successive experiments using a significantly more expensive but higher powered laser have confirmed log linear behavior up to and including 600 degrees C. FIG. 9B is a plot of lifetime data after the more powerful excitation for a solar tint sample. A pulsed Alexandrite laser having a pulse energy approximately 1000 times greater (about 50,000 µJ) than the dye laser was used for this experiment. To obtain more accurate lifetime data from any pulsed excitation source, it is also contemplated that a gated version of the PMT could be used to more efficiently detect photoluminescence by only detecting light after the laser pulse and excluding light due to the prompt emission from the glass.

In addition, background noise primarily originated from the oven surface located below the glass samples in the experimental setup. For many of the applications described herein, similar heated oven surfaces would not be in such close proximity to the excited region so as to be a relatively significant source of noise. Moreover, where a pulsed laser is not needed, for example where substantially continuous excitation is used, a high power light source able to produce fluorescence at a high enough level to overcome any background noise can be more economically provided.

As mentioned above, many other mechanisms may also lead to predictions that are reasonably consistent with the data. One such mechanism is multiphonon decay, where transitions between excited electronic states are facilitated through interactions with several phonons. Such a process adequately describes fluorescence lifetimes of rare-earth ions in glass. For certain rare-earth ions, the electronic states are known, and estimates of the number of phonons necessary to facilitate a transition can be made. However, in the case of $Fe_2O_3$ in glass this mechanism cannot presently be tested since the energies and properties of other electronic states have not been established.

Figure 11:
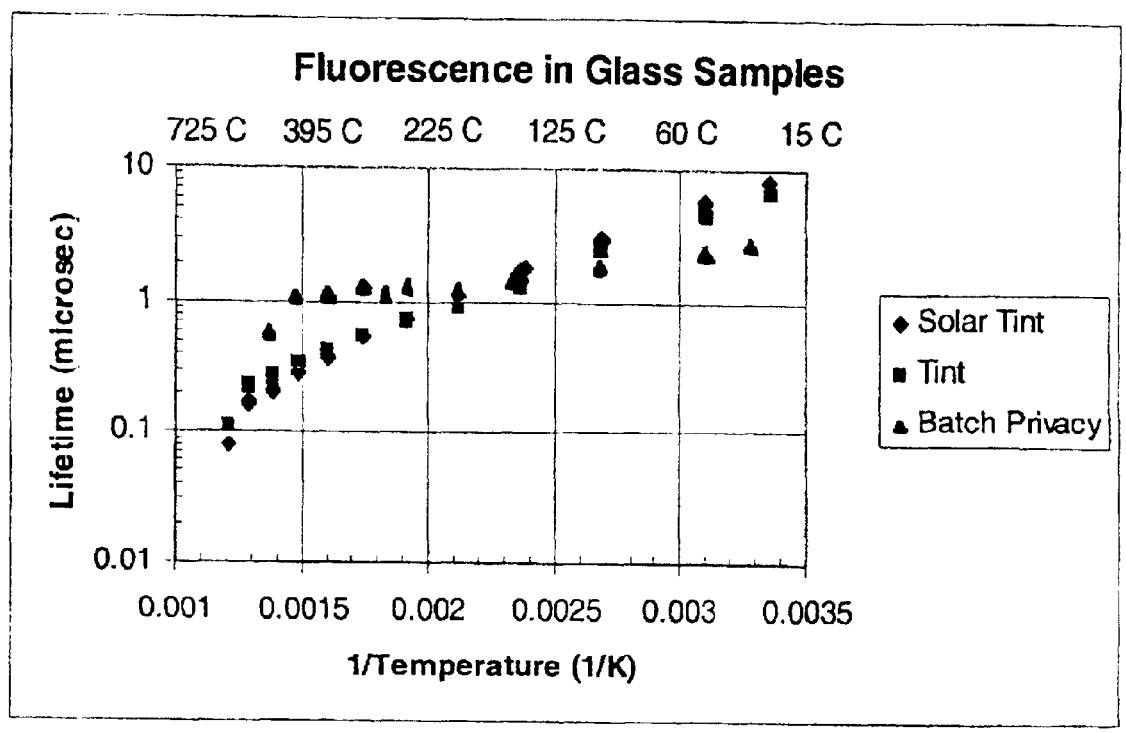
FIG. 11 is a plot of the fluorescence lifetime in microseconds as a function of inverse Kelvin temperature for glass samples.

Plots of the fluorescence lifetimes as a function of inverse temperature are shown in FIG. 11 for Tint, Solar Tint, and Batch Privacy glass samples. Several observations can be made from the plots. All three samples follow different curves, and thus separate calibrations for each glass type can be used to provide more accurate temperature data. The Tint and Solar Tint samples show only minor differences and thus a single calibration curve could potentially be utilized. The Batch privacy sample shows a change of only about a factor of ten in fluorescence lifetime over the experimental temperature range, and thus use of fluorescence lifetime as a temperature indicator, while possible, might be less practical for temperature analysis of Batch privacy glass.

Figure 12:
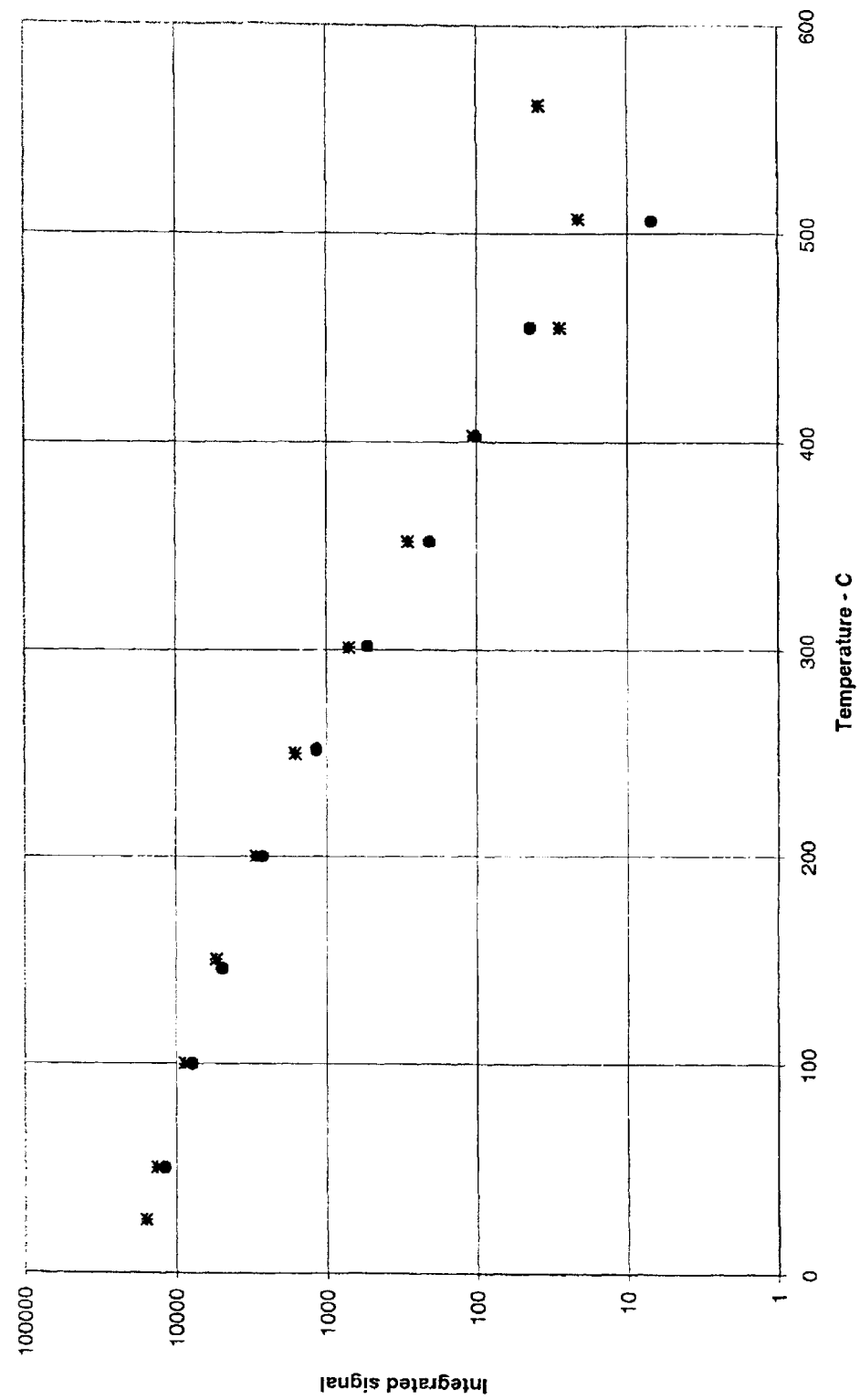
FIG. 12 is a representative plot of the total detected emission above the background noise versus temperature where the emission is detected beginning 0.1 microseconds after a pulse excitation.

As an alternative to calculating the fluorescence lifetime, the integral of the fluorescence signal after the pulse excitation can be measured. This quantity is also correlated to temperature, as illustrated in FIG. 12, which shows a plot of the integrated signal from the bottom portion of the solar tint sample after pulse excitation at various temperatures. The different symbols refer to measurements taken while increasing, or while decreasing the overall temperature of the glass sample.

Even if background noise can be completely controlled or mitigated there will still be some fundamental limit to the attainable precision of the method. Taking the derivative of equation (3) we obtain $$\frac{d\tau}{\tau} = \frac{E_a}{k} \frac{dT}{T^2} \quad (4)$$

Therefore, if equation (3) is a reasonably close approximation of the dependence of fluorescence lifetime on temperature, we can roughly estimate the precision with which we can measure temperature from equation (4). If we assume that lifetimes can be measured to within an accuracy of 1% and use $E_a=0.17$ eV and $k=8.6\times10^{-5}$ eV/K then the precision with which we can determine temperature can be calculated. At a temperature of 300 K we obtain $\delta T=0.5$ K. For 900 K we obtain $\delta T=4.1$ K. These uncertainties are sufficiently small for the method to be viable in glass industry applications.

Figure 13:
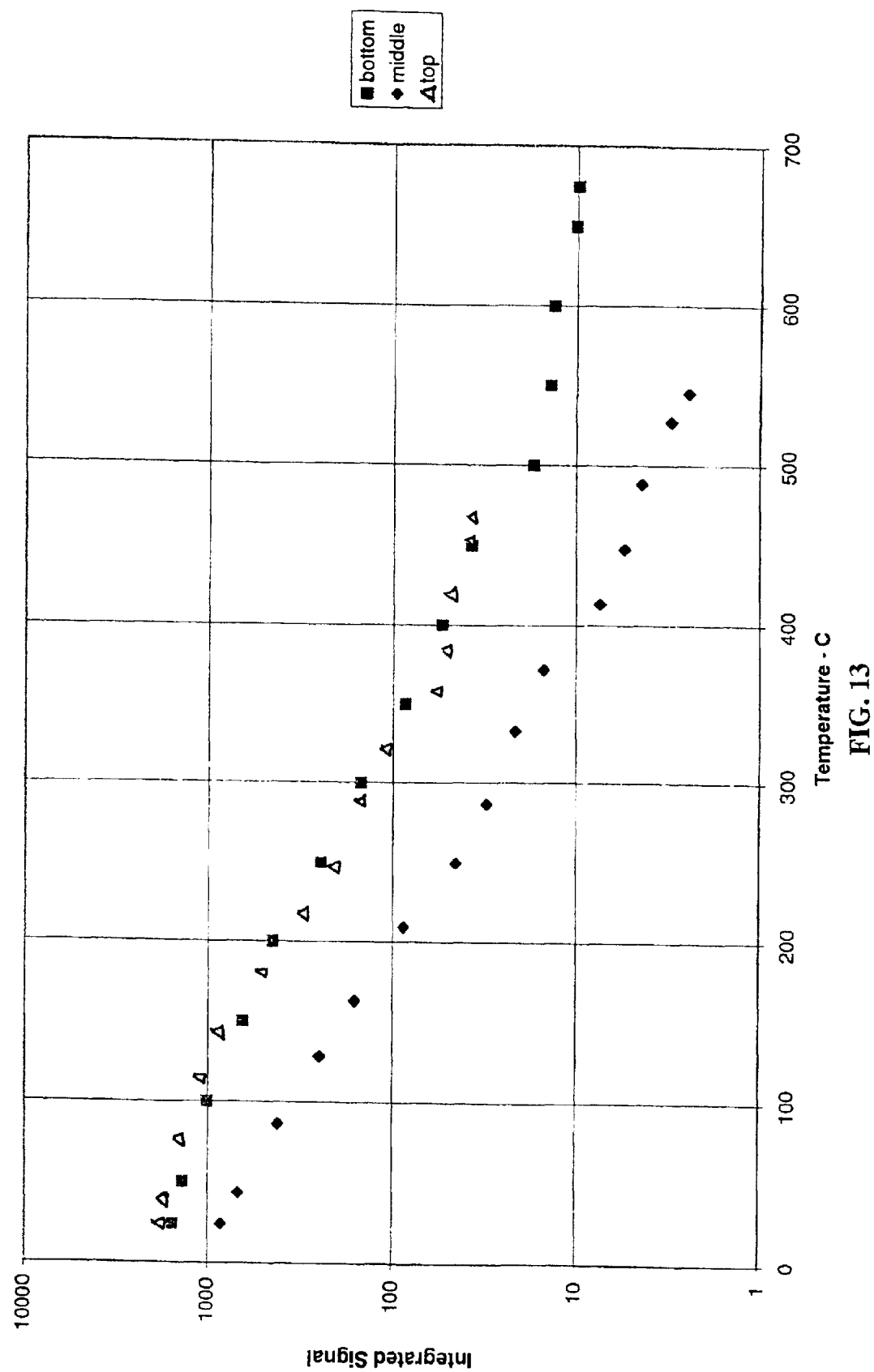
FIG. 13 is a representative plot of the total detected emission above the background signal versus temperature where the emission is detected during and after pulse excitation.

It is to be understood that other elements, materials, or ions in glass can be used as temperature diagnostic according to the principles of the present invention. For example, FIG. 13 illustrates the temperature dependent fluorescence signal for television glass containing cerium. Cerium was present in the 0.5 inch thick television glass as $CeO_2$ at about 0.27% by weight. It was found that, while the fluorescence lifetime (approximately 100 nanoseconds) did not vary in a significant measurable amount with temperature, the total integrated fluorescence signal did.

For the cerium data of FIG. 13, fluorescence was excited at approximately the same wavelength as for the iron experiments, but the fluorescence wavelength in this case was measured at about 420 nm rather than 670 nm. Data were taken and are presented from the top, middle, and bottom portions of the glass. The fluorescence data represents the total integrated signal of the fluorescence signal taken during a pulse excitation and for a period of several typical lifetimes after pulse termination. As can be seen, the total amount of detected fluorescence at constant excitation strength is correlated to temperature and can be used as a temperature diagnostic according to the principles of the invention disclosed herein.

While the above described preferred embodiments have utilized iron and cerium individually as the fluorescence element, other elements or combination of elements can be used as well. For example, the fluorescence signal of both excited cerium and excited iron can be detected in a single piece of glass. In another embodiment, the fluorescence element is any one or more lathanides and/or any one or more rare earth elements. In other embodiment the element is any element that produces a measurable fluorescence. In other embodiments the element is any element that produces a fluorescence signal whose strength and/or lifetime is temperature dependent.

It is further to be understood that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed:

1. A method for sensing the temperature of glass during a manufacturing operation comprising:

subjecting glass having a first temperature to thermal changes by delivering a fluid having a second temperature to the glass, the second temperature different than the first temperature, delivering an excitation beam through the fluid to excite photoluminescence in the glass, detecting the excited photoluminescence from at least one location within the glass;

determining the temperature of the glass at the at least one location from the detected photoluminescence.

2. The method of claim 1 wherein the fluid is a cooling fluid.

3. The method of claim 2 further comprising adjusting the flow of the cooling fluid in response to the detected photoluminescence at at least one location in the glass.

4. The method of claim 3 wherein the cooling fluid is delivered from a plurality of orifices and wherein the adjusting includes controlling fluid flow through the plurality of orifices.

5. The method of claim 4 wherein the at least one location comprises approximately the center of the thickness of the glass.

6. The method of claim 2 further comprising:
detecting the excited photoluminescence from a plurality of points at varying depths in the glass; and
determining the temperature of the glass at the plurality of locations from the detected photoluminescence.

7. The method of claim 6 wherein the glass comprises iron or cerium and the excitation beam excites photoluminescence of the iron or cerium.

8. The method of claim 7 wherein the excitation beam comprises light having a wavelength between about 300 nm and about 450 nm.

9. The method of claim 8 wherein the detected photoluminescence has a wavelength between about 600 nm and about 750 nm or between about 400 nm to about 450 nm.

10. The method of claim 1 wherein the photoluminescence is detected while the excitation beam is delivered.

11. The method of claim 10 wherein the excitation beam is substantially continuous while the excited photoluminescence is detected.

12. The method of claim 11 further comprising:
detecting excited photoluminescence and scattered excitation light at a plurality of locations at varying depths in the glass, and
determining the temperature at the plurality of locations from the detected scattered excitation light and the detected photoluminescence.

13. A method of determining a portion of the temperature distribution in a piece of glass comprising:
selecting an element in the glass,
exciting photoluminescence of the selected element at at least one location within the glass with a substantially continuous light source,
while exciting the photoluminescence, detecting the excited photoluminescence over a predetermined time period from the at least one location within the glass, determining the temperature at the at least one location from the detected photoluminescence.

14. The method of claim 13 wherein said glass includes a portion with a first surface and an opposing second surface defining a thickness therebetween and wherein the at least one location comprises approximately a midpoint between the first and second surfaces.

15. The method of claim 14 wherein the at least one location comprises a plurality of locations at varying depths between the first and second surfaces.

16. The method of claim 13 further comprising:
detecting scattered excitation light from the substantially continuous light source at the plurality of locations for a predetermined time period, and
determining the temperature at the plurality of locations from the detected scattered excitation light and the detected photoluminescence.

17. The method of claim 16 further comprising
comparing the detected scattered excitation light and the detected photoluminescence to determine the temperature.

18. The method of claim 17 wherein the substantially continuous light source produces light with a wavelength between about 300 nm and about 450 nm and the glass comprises $Fe_2O_3$ or cerium.

19. The method of claim 13 further comprising determining the temperature at a predetermined location on the glass sheet without using the detected photoluminescence, and determining the temperature relative to the determined temperature at the predetermined location with the detected photoluminescence.

20. The method of claim 13 further comprising:
cooling the sheet with a cooling fluid;
delivering an excitation beam to the glass sheet through the cooling fluid to excite photoluminescence in the glass.

21. The method of claim 20 further comprising adjusting the flow of the cooling fluid in response to the determined temperature at the plurality of locations.

22. A system for processing glass comprising:
a furnace for heating glass products to a workable state,
a quenching assembly for cooling the glass and causing temperature gradients to be present within the glass,
at least one temperature sensing assembly, the sensing assembly comprising a light source and a detector, the light source adapted to deliver a beam of excitation light to the glass to excite photoluminescence from at least one location in the glass, the detector adapted to produce at least one signal in response to sensed photoluminescence emitted from the at least location in the glass,
a processor connected to the detector, the processor adapted to interpret the at least one signal to evaluate the temperature of the glass at the at least one location and produce at least one output control signal; and
a controller adapted to control the temperature of the glass, the controller operable in response to the output control signal;
wherein the controller controls the quenching assembly to adjust the temperature of the glass.

23. The system of claim 22 wherein the at least one location comprises approximately the midpoint between top and bottom surfaces of the glass.

24. The system of claim 23 wherein the at least one location comprises a plurality of locations at varying depths between the top and bottom surfaces.

25. The system of claim 24 wherein the controller controls the furnace to adjust the temperature of the glass.

26. The system of claim 24 wherein the processor is integral with the detector.

27. The system of claim 22 wherein
the detector is adapted to detect the scattered excitation light from the at least one location and wherein the processor determines the temperature at the at least one location from a ratio between the detected scattered excitation light and the detected photoluminescence.

28. The system of claim 27, wherein
the controller adjusts at least one of the furnace or quenching assembly in response to the determined temperature at the at least one location substantially deviating from a desired temperature.

29. A system for processing class comprising:

a furnace for heating glass products to a workable state, a quenching assembly for cooling the glass and causing temperature gradients to be present within the glass, at least one temperature sensing assembly the sensing assembly comprising a light source and a detector, the light source adapted to deliver a beam of excitation light to the glass to excite photoluminescence from at least one location in the glass, the detector adapted to produce at least one signal in response to sensed photoluminescence emitted from the at least location in the glass, a processor connected to the detector, the processor adapted to interpret the at least one signal to evaluate the temperature of the glass at the at least one location and produce at least one output control signal; and a controller adapted to control the temperature of the glass, the controller operable in response to the output control signal;

wherein the detector is located at the quenching assembly and provides temperature profile information to the controller while glass is being quenched, the temperature profile information changing as the glass is quenched.

30. The system of claim 29, wherein the controller adjusts the quenching assembly in response to the changing temperature profile information.

31. The system of claim 30, wherein the quenching assembly includes a plurality of nozzles each having an orifice and the controller adjusts at least one of the nozzles or orifices.

32. The system of claim 22 further comprising movers for conveying the glass and wherein the movers are activated in response to the sensed temperature.

33. A method of processing tempered glass comprising heating glass to an elevated working temperature, cooling the glass to a lower formed temperature at a quenching station, sensing the temperature profile of the glass at the quenching station by exciting photoluminescence in the glass at a plurality of locations at varying depths in the glass, detecting the excited photoluminescence at the plurality of locations, determining the temperature at the plurality of locations from the detected photoluminescence, evaluating the quality of the glass based on the sensed temperature profile.

34. The method of claim 33 further comprising adjusting an operating parameter based on the quality of the glass, the operating parameter comprising a heating rate or a cooling rate of the glass.

35. The method of claim 33 wherein a set of predetermined temperature ranges are established for acceptable glass product and said evaluating compares sensed temperatures to the set of predetermined temperature ranges, and further comprising rejecting glass products with sensed temperatures outside the predetermined temperature ranges.

36. The method of claim 33, wherein detecting the excited photoluminescence at the plurality of locations includes imaging the excited photoluminescence onto a segmented detector and correlating the response from one or more segments on the detector with one or more of the plurality of locations.

37. The method of claim 36 further comprising detecting scattered excitation light from the plurality of locations and comparing the detected scattered excitation light with the detected photoluminescence.

38. A temperature sensor for sensing the temperature of glass during processing, the sensor comprising:

a source of an excitation beam, the source comprising a source of excitation light and focusing optics to focus the beam through a piece of glass to form an excitation region within the glass, a detector assembly, the detector assembly comprising imaging optics and at least first and second segmented detectors, the imaging optics adapted to image light from the excitation region within the glass onto the first and second detectors, wherein the first detector detects the excited photoluminescence from the excitation region, one or more of the segments of the first detector receiving light from the imaging optics corresponding to one or more locations at varying depths in the glass.

39. The sensor of claim 38 wherein the second detector detects the scattered excitation light from the excitation region.

40. The sensor of claim 39 further comprising a processor for determining the temperature of the glass in the excitation region from the detected excited photoluminescence.

41. The sensor of claim 40 wherein the processor determines the temperature of the glass from the detected excited photoluminescence and the detected scattered excitation light.

42. The sensor of claim 41 further comprising a controller for controlling a glass processing variable in response to the determined temperature of the glass.

43. The sensor of claim 38 further comprising a beam splitter for selectively directing excitation light to the second detector and excited photoluminescence to the first detector.

44. The sensor of claim 38 wherein the detector assembly is spaced from the excitation beam source such that the excitation beam and the focal axis of the imaging optics are substantially non parallel.

45. The method of claim 13 wherein the selected element is a rare earth element.

46. The method of claim 13 wherein the selected element is a lanthanide.

* * * * *